US00RE35695E

United States Patent [19]

Kanayama et al.

[11] E Patent Number: Re. 35,695

[45] Reissued Date of Patent: Dec. 16, 1997

[54] STABILIZED POLYPHENYLENE ETHER RESIN AND PROCESS FOR THE PREPARATION OF THE SAME

[75] Inventors: Akihiro Kanayama, Chiba-ken; Sumio Ueda, deceased, late of Chiba-ken; Yoshiko Ueda, heiress, Kurashiki; Sadao Ibe, Tokyo, all of Japan

[73] Assignee: Asahi Kasei Kogyo Kabushiki Kaisha, Osaka, Japan

[21] Appl. No.: 330,063

[22] PCT Filed: May 30, 1989

[86] PCT No.: PCT/JP89/00538

§ 371 Date: Aug. 26, 1989

§ 102(e) Date: Aug. 26, 1989

Related U.S. Patent Documents

Reissue of:

[64] Patent No.: 5,159,027
Issued: Oct. 27, 1992
Appl. No.: 400,120
Filed: May 30, 1989

[30] Foreign Application Priority Data

Jan. 27, 1989 [JP] Japan ..... 1-16300

[51] Int. Cl.[6] ..... C08L 71/12

[52] U.S. Cl. ..... 525/391; 525/392; 525/132; 525/905

[58] Field of Search ..... 525/391, 132, 525/392, 905

[56] References Cited

U.S. PATENT DOCUMENTS

| | | |
|---|---|---|
| 3,361,851 | 1/1968 | Gowan . |
| 3,767,627 | 10/1973 | Schoen et al. . |
| 3,929,930 | 12/1975 | Izawa et al. . |
| 3,994,856 | 11/1976 | Katchman . |
| 4,054,553 | 10/1977 | Olander . |
| 4,092,294 | 5/1978 | Bennett, Jr. et al. . |
| 4,097,556 | 6/1978 | Toyama et al. . |
| 4,145,377 | 3/1979 | Bussink . |
| 4,166,055 | 8/1979 | Lee . |
| 4,239,673 | 12/1980 | Lee . |
| 4,242,263 | 12/1980 | Lee . |
| 4,383,082 | 5/1983 | Lee . |
| 4,528,327 | 7/1985 | Cooper . |
| 4,617,346 | 10/1986 | Sonoda . |
| 4,670,537 | 6/1987 | White . |
| 4,678,839 | 7/1987 | Hallgren et al. . |
| 4,760,118 | 7/1988 | White et al. . |
| 4,788,277 | 11/1988 | Ibe et al. . |
| 4,863,997 | 9/1989 | Shibuya . |
| 4,888,397 | 12/1989 | van der Meer et al. . |
| 4,933,425 | 6/1990 | Gallucci . |

FOREIGN PATENT DOCUMENTS

| | | |
|---|---|---|
| 115712 | 8/1984 | European Pat. Off. . |
| 263264 | 4/1988 | European Pat. Off. . |
| 263265 | 4/1988 | European Pat. Off. . |
| 326895 | 8/1989 | European Pat. Off. . |
| 329423 | 8/1989 | European Pat. Off. . |
| 427069 | 3/1942 | Japan . |
| 45-40551 | 12/1970 | Japan . |
| 46-32427 | 9/1971 | Japan . |
| 49-17679 | 5/1974 | Japan . |
| 49-48197 | 12/1974 | Japan . |
| 60-72980 | 4/1985 | Japan . |
| 63-126968 | 6/1988 | Japan . |
| 63-152628 | 6/1988 | Japan . |
| 113058 | 7/1988 | Japan . |
| 218748 | 9/1988 | Japan . |
| 225642 | 9/1988 | Japan . |
| 245453 | 10/1988 | Japan . |
| 63-295632 | 12/1988 | Japan . |
| 63-301222 | 12/1988 | Japan . |
| 40556 | 2/1989 | Japan . |
| 98647 | 4/1989 | Japan . |
| 1-172451 | 7/1989 | Japan . |
| 204939 | 8/1989 | Japan . |
| 221444 | 9/1989 | Japan . |
| 1-297428 | 11/1989 | Japan . |
| 7410861 | 8/1974 | Netherlands . |

OTHER PUBLICATIONS

Martin, Robert W., "The Chemistry of Phenolic Resins", John Wiley & Sons, New York 1956 (pp. 189, 190, 205).

*Primary Examiner*—David Buttner
*Attorney, Agent, or Firm*—Armstrong, Westerman, Hattori, McLeland & Naughton

[57] ABSTRACT

Disclosed is a stabilized polyphenylene ether resin which comprises a plurality of polyphenylene ether chains, which chains collectively contain terminal 6-chroman groups in an amount of at least 0.01 in terms of the number of the terminal 6-chroman groups per 100 polyphenylene ether units in the resin. This polyphenylene ether resin has excellent resistance to thermal oxidation. A composition comprising this stabilized polyphenylene ether resin and a polystyrene resin has not only high resistance to thermal oxidation but also excellent moldability.

15 Claims, No Drawings

STABILIZED POLYPHENYLENE ETHER RESIN AND PROCESS FOR THE PREPARATION OF THE SAME

Matter enclosed in heavy brackets [ ] appears in the original patent but forms no part of this reissue specification; matter printed in italics indicates the additions made by reissue.

DESCRIPTION

1. Technical Field

The present invention relates to a novel polyphenylene ether resin and a process for the preparation of the same. More particularly, the present invention relates to a novel polyphenylene ether resin in which the polyphenylene ether chains resin collectively contain at least a specific amount of terminal 6-chroman groups and which has an improved resistance to thermal oxidative deterioration at the time of processing and at the time of use at high temperatures, and also to a process for the preparation of the same. Furthermore, the present invention relates to a composition comprising this novel polyphenylene ether resin and a polystyrene resin.

2. Background Art

Polyphenylene ethers have excellent mechanical properties, electrical characteristics and heat resistance and, therefore, are widely used as thermoplastic molding materials. However, polyphenylene ethers have, as well as these advantageous properties, a disadvantage in that they are likely to undergo thermal oxidative deterioration. Accordingly, their use is limited in the fields where they are likely to undergo thermal oxidative deterioration. For obviating this disadvantage, uses of various stabilizers, such as amines and organic phosphorus compounds, have been proposed.

On the other hand, processes of modifying a polyphenylene ether per se have also been proposed. For example, Japanese Patent Publication Nos. 49-17679 and 49-48197 and the specification or U.S. Pat. No. 3,767,627 (Japanese Patent Publication No. 53-12553) teach that resistance to thermal oxidative deterioration is improved by blocking terminal phenolic groups of a polyphenylene ether by esterification, etherification or the like. With respect to polyphenylene ether resins modified by these processes, a stabilization is achieved, to a certain extent, in a film prepared by casting a solution of the modified resin in an organic solvent, but with respect to a test piece or film prepared by melt molding, a satisfactory stabilizing effect is not obtained.

The reason for this is considered to be as follows. For example, with respect to poly[oxy(2,6-dimethyl-1,4-phenylene)], which is commercially very important, a phenolic hydroxyl group shown in formula (e):

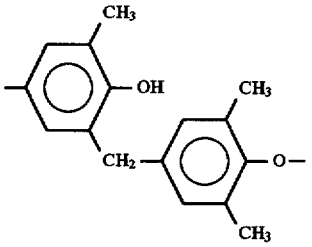

(e)

is formed by heat applied in the melt molding and this phenolic hydroxyl group causes thermal oxidative deterioration as in the case of an uncapped phenolic hydroxyl group.

For obviating this disadvantage, a process has recently been proposed in which a hydroxyl group-blocking agent, such as a salicylic acid ester, is used at the melt molding (the specification of U.S. Pat. No. 4,760,118 and Japanese Patent Application Laid-Open Specification No. 63-295632). According to this process, the hydroxyl group of formula (e) is blocked as shown by formula (f) and a certain degree of improvement can be attained:

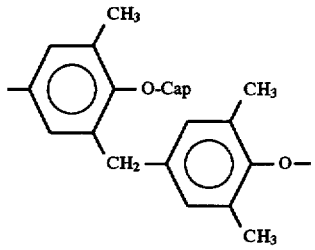

(f)

However, the methylene group present between the two benzene rings, which is activated by these benzene rings and is very likely to undergo oxidation, is left as it is, and therefore, the resistance to thermal oxidation is still unsatisfactory. Furthermore, in this process, various by-products, which are likely to plasticize the polyphenylene ether resin, are formed, and the melt-molded product is likely to be plasticized by these by-products left in the melt-molded product. Therefore, another disadvantage arises in that in order to remove these by-products, the resin should be dissolved and subjected to a re-precipitation treatment.

DISCLOSURE OF THE INVENTION

In these situations, the present inventors have made extensive and intensive studies, and as a result, it has unexpectedly been found that when a 6-chroman group is present at a terminal of a polyphenylene ether, the stability of the polyphenylene ether resin in the melt molding is highly improved and such a partial structure as shown by the following formula (g):

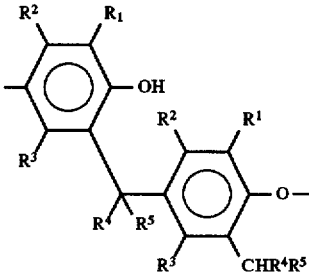

(g)

wherein $R^1$ through $R^5$ each independently represent a hydrogen atom, an alkyl group, a substituted alkyl group, a halogen atom, an aryl group or a substituted aryl group, which is likely to cause thermal oxidative deterioration and a representative example of which is the structure of formula (e), is substantially not formed in the polyphenylene ether chain. In the present invention, the term "6-chroman group" used herein is intended to mean an unsubstituted or substituted 6-chroman group. The present invention has now been completed based on this finding.

It is therefore an object or the present invention to provide a stabilized polyphenylene ether resin having high resistance to thermal oxidative deterioration.

Another object of the present invention is to provide a process for preparing a polyphenylene ether resin having the above characteristics, which can easily be practiced.

Still another object of the present invention is to provide a composition comprising the above-mentioned polyphenylene ether resin and a polystyrene resin, which has excellent moldability as well as excellent resistance to thermal oxidative deterioration.

More specifically, in accordance with the present invention, there is provided a polyphenylene ether resin comprising a plurality or polyphenylene ether chains, each comprising recurring phenylene ether units, said plurality of polyphenylene ether chains collectively containing terminal 6-chroman groups represented by the following formula (a):

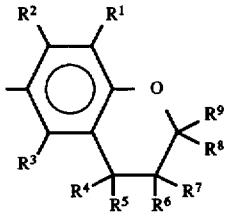

(a)

wherein $R^1$ through $R^5$ each independently represent a hydrogen atom, an alkyl group, a substituted alkyl group, a halogen atom, an aryl group or a substituted aryl group, and $R^6$ through $R^9$ each independently represent a hydrogen atom, an alkyl group, a substituted alkyl group, an alkenyl group, a substituted alkenyl group, a halogen atom, an aryl group, a substituted aryl group, an alkoxyl group, an N-lactam group, a carboxylic acid amide group, a carboxylic acid group, a carboxylic anhydride group, a carboxylic acid ester group, a nitrile group, an acyl group or an acyloxy group, with the proviso that $R^6$ and $R^7$, and $R^8$ and $R^9$ are independently bonded to form a ring, or are not bonded to each other, wherein the amount of said terminal chroman groups is at least 0.01 in terms of the number of the terminal 6-chroman groups per 100 phenylene ether units in the resin, and the number average molecular weight of the resin is in the range of from 1,000 to 100,000.

As described above, the polyphenylene ether resin of the present invention comprises polyphenylene ether chains containing 6-chroman groups as terminal groups. In the polyphenylene ether resin of the present invention, it is indispensable that a plurality of polyphenylene ether chains collectively contain terminal 6-chroman groups represented by the following formula (a):

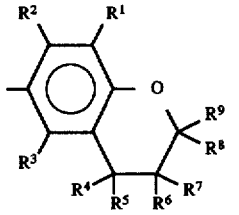

(a)

wherein $R^1$ through $R^5$ each independently represent a hydrogen atom, an alkyl group, a substituted alkyl group, a halogen atom, an aryl group or a substituted aryl group, and $R^6$ through $R^9$ each independently represent a hydrogen atom, an.alkyl group, a substituted alkyl group, an alkenyl group, a substituted alkenyl group, a halogen atom, an aryl group, a substituted aryl group, an alkoxy group, an N-lactam group, a carboxylic acid amide group, a carboxylic acid group, a carboxylic anhydride group, a carboxylic acid ester group, a nitrile group, an acyl group or an acyloxy group, with the proviso that $R^6$ and $R^7$, and $R^8$ and $R^9$ are independently bonded to form a ring, or are not bonded to each other, in an amount of at least 0.01 in terms of the number of the terminal 6-chroman groups per 100 phenylene ether units in the resin. If the number average molecular weight of the polyphenylene ether resin is within the range suitable for use as an engineering resin (about 10,000 to about 30,000), it is preferred that the number of the terminal 6-chroman groups be at least 0.15, especially at least 0.2, per 100 phenylene ether units. The upper limit is not particularly critical, and the larger the amount of the terminal 6-chroman groups, the higher the resistance of the resin to thermal oxidative deterioration. Throughout the specification, $R^1$ through $R^9$ have the same meanings as defined for formula (a) unless otherwise specified.

The polyphenylene ether chain of the polyphenylene ether resin of the present invention is defined as having phenylene ether units generally represented by

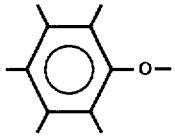

as recurring units, and there is not any other particular limitation. Representative examples of polyphenylene ether chains include those which are comprised of at least one type of phenylene ether units represented by the following formula (b):

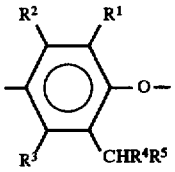

(b)

wherein $R^1$ through $R^5$ each independently represent a hydrogen atom, an alkyl group, a substituted alkyl group, a halogen atom, an aryl group or a substituted aryl group. These chains may further contain monomer units represented by formulae (h), (i) and (j) described hereinafter.

In the definition of $R^1$ through $R^5$, the alkyl group is an alkyl group having 1 to 20 carbon atoms, preferably 1 to 10 carbon atoms. As the substituent of the substituted alkyl group, there can be mentioned a halogen atom, such as fluorine, chlorine or bromine, a hydroxyl group, an amino group, and a lower alkoxyl group. The aryl group is an aryl group having 6 to 20 carbon atoms. As the substituent of the substituted aryl group, there can be mentioned a lower alkyl group, a halogen atom, such as fluorine, chlorine or bromine, a hydroxyl group, an amino group, and a lower alkoxyl group. When a phenylene ether polymer as the essential skeleton of the polyphenylene ether resin of the present invention is prepared by oxidative coupling polymerization of a phenol which is an industrially advantageous method, it is preferred that $R^1$ be a lower alkyl group, such as a methyl, ethyl, propyl, isopropyl or n-butyl group, or a phenyl or naphthyl group, and that $R^2$ through $R^5$ are each independently a hydrogen atom or a lower alkyl group. Especially preferred examples of combinations of substituents include a combination in which $R^1$ is a methyl or phenyl group and each of $R^2$ through $R^5$ is a hydrogen atom, and a combination in which each of $R^1$ and $R^2$ is a methyl group and each of $R^3$ through $R^5$ is a hydrogen atom. It is particularly preferred that $R^1$ be a methyl group and each of $R^2$ through $R^5$ be a hydrogen atom, and phenylene ether units of this type be contained in an amount of 90 to 100%, based on the total phenylene ether units. As the monomer corresponding to the phenylene ether unit having the most preferred $R^1$ through $R^5$ satisfying these conditions, there can be mentioned (i) 2,6-dimethylphenol, (ii) 2-methyl-6-phenylphenol and (iii) 2,3,6-trimethylphenol. A homopolymer of monomer (i) or (ii) or a copolymer of monomer (i) with monomer (ii) and/or monomer (iii) is preferably used as the polyphenylene ether polymer as the essential skeleton of the resin of the present invention.

Other various phenylene ether units, inclusion of which into polyphenylene ether resins has conventionally been proposed, may be contained as partial structures in the polyphenylene ether resin of the present invention, as long as the intended improvement of heat stability is not hindered. For example, Japanese Patent Application No. 63-126968 and Japanese Patent Application Laid-Open Specification No. 63-301222 propose incorporation of 2-(dialkylaminomethyl)-6-methylphenylene ether units represented by the following formula (h):

(h)

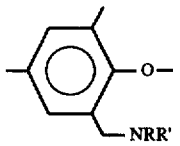

wherein R and R' each independently represent an alkyl group having 1 to 20 carbon atoms, a hydroxyalkyl group having 1 to 20 carbon atoms, an alkoxyalkyl group having 2 to 22 carbon atoms, an acyloxyalkyl group having 3 to 22 carbon atoms or a polyalkylene ether group having 4 to 20 carbon atoms, and 2-(N-alkyl-N-phenylaminomethyl)-6-methylphenylene ether units represented by the following formula (i):

(i)

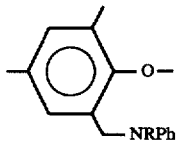

wherein R represents an alkyl group having 1 to 20 carbon atoms, a hydroxyalkyl group having 1 to 20 carbon atoms, an alkoxyalkyl group having 2 to 22 carbon atoms, an acyloxyalkyl group having 3 to 22 carbon atoms or a polyakylene ether group having 4 to 20 carbon atoms and Ph represents a phenyl group.

For introducing more than one terminal 6-chroman group (a) per molecule or the polyphenylene ether chain, incorporation of, for example, polyvalent ether units represented by the following formula (j):

(j)

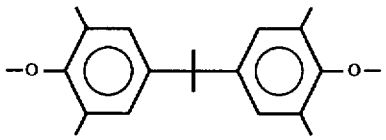

is effective.

The molecular weight of the polyphenylene ether resin of the present invention is 1,000 to 100,000 in terms of number average molecular weight. The number average molecular weight of the resin is preferably in the range of from about 6,000 to about 60,000. When the polyphenylene ether resin is used as an engineering resin, it is especially preferred that the number average molecular weight be about 10,000 to about 30,000. The number average molecular weight referred to in the present invention is determined by gel permeation chromatography, using the calibration curve of standard polystyrene.

As described hereinbefore, in the present invention, it is indispendable that a plurality of polyphenylene ether chains collectively contain terminal 6-chroman groups represented by formula (a) in an amount of at least 0.01 in terms of the number of the terminal chroman groups per 100 phenylene ether units in the resin.

In formula (a), $R^1$ through $R^5$ are as defined for formula (b).

$R^6$ through $R^9$ each independently represent a hydrogen atom, an alkyl group, a substituted alkyl group, an alkenyl group, a substituted alkenyl group, a halogen atom, an aryl group, a substituted aryl group, an alkoxy group, an N-lactam group, a carboxylic acid group, a carboxylic anhydride group, a carboxylic acid ester group, a carboxylic acid amide group, a nitrile group, an acyl group or an acyloxy group. $R^6$ and $R^7$, and $R^8$ and $R^9$ are independently bonded to form a ring, or are not bonded to each other. In the definition of $R^6$ through $R^9$, the alkyl group is an alkyl group having 1 to 20 carbon atoms, preferably 1 to 10 carbon atoms, and a lower alkyl group is especially preferred. As the substituent of the substituted alkyl group, there can be mentioned a halogen atom, such as fluorine, chlorine and bromine, a hydroxyl group, an amino group, and a lower alkoxyl group. A lower alkenyl group, such as an ethylenyl group or a 3-propenyl group is preferred as the alkenyl group. A typical example of a substituted alkenyl group is a 1-hydroxyl-3-propenyl group. The aryl group is an aryl group having 6 to 20 carbon atoms. As the substituent of the substituted aryl group, there can be mentioned a lower alkyl group, a lower alkoxyl group, a halogen atom, such as fluorine, chlorine and bromine, a hydroxyl group, an amino group, and an aminoalkyl group, such as an aminomethyl group. The term "aryl group" means an aromatic ring group in a broad sense, and the aryl group includes not only an aryl group in a narrow sense but also a heterocyclic aromatic ring group, such as a pyridyl group or a triazyl group. Representative examples of N-lactam groups include N-2-pyrrolidonyl and N-ε-caprolactamoyl groups. Representative examples of carboxylic acid amide groups include carbamoyl, phenylcarbamoyl and ceryl groups. Acetoxycarbonyl and benzoyloxycarbonyl groups are preferred as the carboxylic anhydride group. As representative examples of carboxylic acid ester groups, there can be mentioned methoxycarbonyl, ethoxycarbonyl and allyloxycarbonyl groups. Acetyl and benzoyl groups can be mentioned as representative examples of acyl groups. Acetoxy and benzoyloxy groups can be mentioned as preferred examples of acyloxy groups.

From the viewpoint of the desired stability of the resin, it is preferred that 2 or 3 substituents, especially 3 substituents, of substituents $R^6$ through $R^9$ each be hydrogen atoms, and in this case, it is preferred that the remaining substituent(s) be selected from aryl groups, substituted aryl groups, carboxylic acid groups, carboxylic anhydride groups, carboxylic acid ester groups, carboxylic acid amide groups, nitrile groups and N-lactam groups. From the viewpoint of stability against thermal oxidative deterioration and also from the viewpoint of the preparation process described hereinafter, it is especially preferred that at least one of $R^8$ and $R^9$ be an aryl group or a substituted aryl group.

As representative examples of aryl groups or substituted aryl groups in the definition of $R^6$ through $R^9$, there can be mentioned phenyl, tolyl, chlorophenyl, naphthyl, 4-pyridyl and 3,5-diamino(s)-triazyl groups.

In the present invention, the amount of terminal 6-chroman groups can be determined by using the nuclear magnetic resonance spectrum.

Since the stabilized polyphenylene ether resin of the present invention has terminal 6-chroman groups (a), when the polyphenylene ether resin is melted, the resin shows excellent properties such that not only is formation of a rearrangement structure (g) much less than in the conventional polyphenylene ether resins but also the molecular weight is substantially not changed. Moreover, the present invention is different from the melting terminal capping process proposed in the specification of U.S. Pat. No. 4,760,118 (Japanese Patent Application Laid-Open Specification No. 63-295632) in that the rearrangement reaction per se is suppressed in the present invention. Therefore, not only formation of hydroxyl groups but also formation of a methylene group which is present between two benzene rings and activated by these benzene rings, is controlled.

Moreover, a problem of plasticization due to the formation of by-products is unlikely to occur, and even if melt molding is carried out repeatedly, not only is a rearrangement structure of formula (g) unlikely to be formed, but also the molecular weight undergoes substantially no change. Accordingly, the polyphenylene ether resin of the present invention is a molding material having excellent stability.

When the stabilized polyphenylene ether resin of the present invention is used as a melt-molding material, it is especially preferred that the number of phenolic hydroxyl groups be not greater than 0.5 per 100 phenylene ether units in the resin and the number of rearrangement structures of formula (g) (typically, a rearrangement structure of formula (e) which would be formed in the case of a resin comprised mainly of poly[oxy(2,6-dimethyl-1,4-phenylene)], which resin is commercially important) be not greater than 0.1 per 100 phenylene ether units in the resin.

As compared to the conventional polyphenylene ethers, the stabilized polyphenylene ether resin of the present invention is advantageous as a molding material in that not only do problems of plasticization and the like not occur, but also deterioration and increase of the viscosity by thermal oxidation in the melt molding are greatly suppressed, and in that a molded article which is improved in suppression of thermal oxidative deterioration which would occur during the use at high temperatures, can easily be obtained.

The stabilized polyphenylene ether resin of the present invention can be prepared according to the following process.

More specifically, in another aspect of the present invention, a process is provided for the preparation of a stabilized polyphenylene ether resin as described above, which comprises heating a phenylene ether polymer having terminal groups represented by the following formula (c):

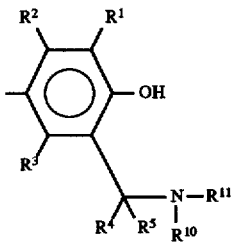

(c)

wherein $R^1$ through $R^5$ are as defined in formula (a), and $R^{10}$ and $R^{11}$ each independently represent a hydrogen atom, an alkyl group or a substituted alkyl group, with the proviso that $R^{10}$ and $R^{11}$ do not simultaneously represent a hydrogen atom, and a compound (hereinafter referred to as "unsaturated compound") having a carbon-to-carbon double bond, which is represented by the following formula (d):

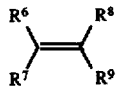

(d)

wherein $R^6$ through $R^9$ are as defined in formula (a). at a temperature of not lower than the glass transition temperature of the phenylene ether polymer in the absence of a radical polymerization initiator.

The alkyl and substituted alkyl groups as $R^{10}$ and $R^{11}$ in formula (c) are preferably selected from alkyl groups having 1 to 20 carbon atoms, hydroxyalkyl groups having 1 to 20 carbon atoms, alkoxyalkyl groups having 2 to 22 carbon atoms, acyloxyalkyl groups having 3 to 22 carbon atoms, and polyalkylene ether groups having 4 to 20 carbon atoms.

A phenylene ether polymer having this terminal group (c) is obtained by subjecting a phenolic compound having at least one benzylic hydrogen at the ortho-position relative to the hydroxyl group to oxidative coupling polymerization or copolymerization in the presence of a catalyst comprising a primary or secondary amine (see, for example, the specification of U.S. Pat. No. 4,788,277). In this case, the obtained polymer is a mixture of a phenylene ether polymer having a terminal group represented by formula (c) and a phenylene ether polymer having a terminal structure in which the primary or secondary amine is not bonded to the benzylic position. In the present invention, this mixture can be used without being separated into the respective phenylene ether polymers. The ratio between the former and latter phenylene ether polymers in the mixture is not particularly critical, but it is preferred that the ratio of the number of terminal groups of the former to the number of terminal groups of the latter be at least 0.4, especially at least 0.9.

The ratio of the unsaturated compound represented by general formula (d) to the phenylene ether polymer having terminal groups represented by formula (c) in the reaction of the present invention is preferably such that the amount of the unsaturated compound of formula (d) is about 2 to about 50 equivalents per equivalent of the phenylene ether polymer having terminal groups represented by formula (c).

The reaction mechanism of the present invention has not completely been elucidated, but it is presumed that terminal groups of formula (a) would probably be formed by Diels-Alder reaction between the unsaturated compound of formula (d) and an intermediate structure of the following formula (k):

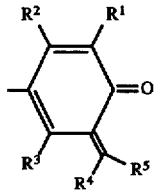

(k)

which is formed by the decomposition of the terminal groups of formula (c) when heated to a temperature of not lower than the glass transition temperature.

With respect to a reaction similar to the above reaction, European Patent Application Laid-Open Specification No. 263264 (Japanese Patent Application Laid-Open Specification No. 63-101417) and European Paten Application Laid-Open Specification No. 263265 (Japanese Patent Application Laid-Open Specification No. 63-101451) disclose reactions represented by the following diagrammatic formulae (l) and (m), respectively:

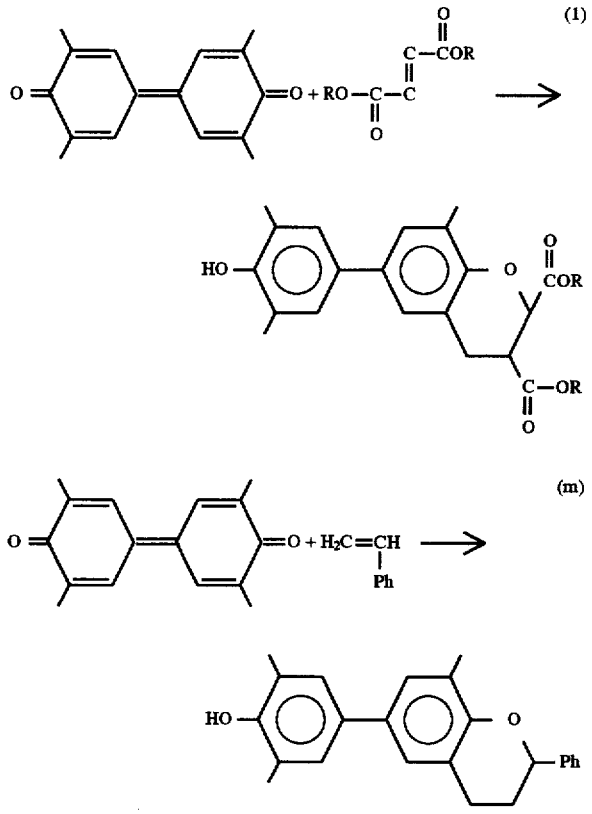

(1)

(m)

However, these formulae are concerned with the reactions for diphenoquinone which is a by-product formed in the preparation of a polyphenylene ether, but not for the phenylene ether polymer per se. Furthermore, these reactions are a solution reaction of low molecules and the reaction time is as long as 30 minutes. These reactions are fundamentally different from the reaction for forming the stabilized polyphenylene ether resin of the present invention.

According to the well-known empirical knowledge and theoretical predictions about unsaturated compounds which are likely to undergo Diels-Alder reaction, it is preferred that at least one of the substituents be an electron withdrawing group, such as a carbonyl group or a cyano group.

As a result of the investigations made by the present inventors, however, it has surprisingly been found that this reaction occurs at a high efficiency in a styrene compound in which one of the substituent is an electron donative phenyl group. It is presumed that in this case, the reaction does not advance through the single-stage concerted reaction mechanism which would generally be predicted, but advances through a route involving as an intermediate a biradical represented by the following formula (n):

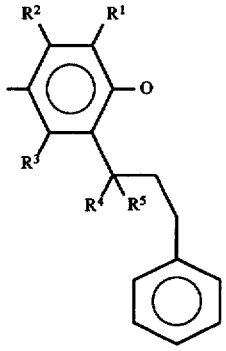

(n)

Accordingly, in the preparation of the stabilized polyphenylene ether resin of the present invention, for stabilizing the intermediate radical, it is preferred to use an unsaturated compound of formula (d) in which $R^8$ and/or $R^9$ are/is an aryl group or a substituted aryl group, as described hereinbefore. Preferred examples of unsaturated compounds (d) include styrene, α-methylstyrene, chlorostyrene, methylstyrene, stilbene, cinnamyl alcohol, benzalacetone, ethyl cinnamate, cinnamoyl nitrile, 4-vinylpyridine and 2-vinyl-3,5-diamino(s)-triazine.

When an asymmetric olefin, such as styrene, is used, the orientation of the formed terminal group is likely to depend on the stability of the intermediate radical. For example, in the case of styrene, a structure having terminal groups of the type represented by formula (o) is likely to be formed:

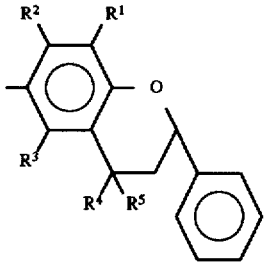

(o)

The technique of modifying a polyphenylene ether with a styrene by melt-kneading in the presence of a radical polymerization initiator is known from the specification of U.S. Pat. No. 3,929,930 (Japanese Patent Publication No. 52-38596) and the specification of U.S. Pat. No. 4,097,556 (Japanese Patent Publication No. 59-11605). However, even if this technique is applied to a phenylene ether polymer having terminal groups (c), such reactions as polymerization of the styrene per se predominantly occur, so that terminal 6-chroman groups (a) are not substantially formed.

Japanese Patent Publication No. 45-40551 and Japanese Patent Publication No. 46-32427 disclose processes in which a polyphenylene ether is reacted with styrene or a styrene derivative in the presence of a basic compound or Bronstead acid. These prior techniques are suitably carried out, using a solution, at a temperature lower than 140° C., and are fundamentally different from the preparation process of the present invention which is suitably carried out in the molten state at a temperature of not lower than the glass transition temperature of the phenylene ether polymer. Furthermore, even if the processes of these prior techniques are used on a phenylene ether polymer having terminal groups (c), terminal 6-chroman groups (a) are substantially not formed, so that the stabilized polyphenylene ether resin of the present invention cannot be prepared.

An unsaturated compound free of an aromatic ring can also be used as unsaturated compound (d). Examples of unsaturated compounds (d) of such a type include acrylic acid; acrylic acid esters, such as methyl acrylate, ethyl acrylate, propyl acrylate, butyl acrylate, isobutyl acrylate, tert-butyl acrylate, 2-ethylhexyl acrylate, octyl acrylate, isodecyl acrylate, lauryl acrylate, lauryltridecyl acrylate, tridecyl acrylate, cetylstearyl acrylate, stearyl acrylate, cyclohexyl acrylate and benzyl acrylate; acrylamide; acrylonitrile; methacrylic acid; methacrylic acid esters, such as methyl methacrylate, ethyl methacrylate, propyl methacrylate, butyl methacrylate, isobutyl methacrylate, tert-butyl methacrylate, 2-ethylhexyl methacrylate, octyl methacrylate, isodecyl methacrylate, lauryl methacrylate, lauryltridecyl methacrylate, tridecyl methacrylate, cetylstearyl methacrylate, stearyl methacrylate, cyclohexyl methacrylate and benzyl methacrylate; methacrylamide; methacrylonitrile; itaconic acid; itaconic acid diesters, such as dimethyl itaconate, diethyl itaconate, dibutyl itaconate, di-2-ethylhexyl itaconate, dinonyl itaconate and dioctyl itaconate; itaconic acid monoesters, such as monomethyl itaconate, monoethyl itaconate, monobutyl itaconate, mono-2-ethylhexyl itaconate, mononyl itaconate and monooctyl itaconate; itaconic anhydride; N-vinyl compounds, such as N-vinylpyrrolidone; and vinyl ethers, such as butyl vinyl ether.

The phenylene ether polymer having terminal groups (c), which is used as the starting material for the stabilized polyphenylene ether resin of the present invention, is considered to be decomposed when melted, to thereby form an intermediate structure represented by the following formula (k):

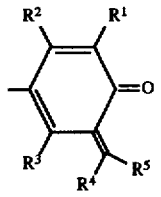

(k)

It has been found that the rate of this type of decomposition of the polyphenylene ether polymer at a temperature higher than about 200° C. is greatly different from the decomposition rate at a temperature lower than about 200° C.

For example, in the case of a phenylene ether polymer having terminal groups represented by the following formula (p):

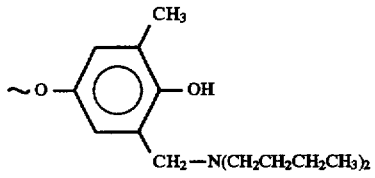

(p)

these terminal groups are substantially completely decomposed within several minutes when heated to 250° C., but these terminal groups are reduced only by half even after the lapse of 10 hours when heated to 180° C.

Accordingly, in the preparation of the stabilized polyphenylene ether resin of the present invention, for example, when a phenylene ether polymer having terminal groups of formula (p) as terminal groups (c) is used, it is preferred that the phenylene ether polymer be mechanically mixed with unsaturated compound (d) at a temperature lower than 180° C. prior to heating to a temperature of not lower than the glass transition temperature. The mixing method is not particularly critical. For example, there can be employed a method in which dry blending is carried out by using a Henschel mixer, a method in which drying is carried out after blending, a method comprising dissolving unsaturated compound (d) in a solvent capable of dissolving unsaturated compound (d)but incapable of dissolving the polyphenylene ether, such as methanol or pentane to obtain a solution, impregnating a powdery polyphenylene ether polymer having terminal groups (c) with the solution and then removing the solvent by drying, a master batch method utilizing the above-mentioned methods, and a method in which a region maintained at a temperature lower than 180° C. is formed upstream of an extruder, and a phenylene ether polymer having terminal groups (c) and unsaturated compound (d) are fed to this region. After heating to a temperature higher than 180° C., the same or different type of unsaturated compound (d) can be additionally supplied. The phenylene ether polymer having terminal groups (c) and unsaturated compound (d), which has been thus mechanically mixed, are heat-melted at a temperature of not lower than the glass transition temperature (about 208° C.) of the phenylene ether polymer. It is preferred that the heating temperature be higher by 20° to 150° C., especially by 50° to 120° C., than the glass transition temperature. The suitable heating time varies according to the temperature and is not simply determined, but the heating is conducted for a time sufficient to complete the reaction. In general, it is sufficient to heat for about 1 minute to several minutes. Too long a heating time does not bring any significant additional effect. Since the rate of the reaction of forming terminal 6-chroman groups (a) is generally very high at a temperature of not lower than the glass transition temperature, application of excessive heat is not preferred.

As described above, it is indispensable that the heating should be carried out in the absence or a radical polymerization initiator. Also oxygen should be purged as much as possible. Accordingly, it is preferred that a nitrogen gas atmosphere or the like be employed as the reaction atmosphere.

The polyphenylene ether resin of the present invention has high compatibility with a polystyrene resin, and when the polyphenylene ether resin of the present invention is blended with a polystyrene resin, a resin composition having improved resistance to thermal oxidative deterioration and a good moldability is obtained.

Namely, in a further aspect of the present invention, there also is provided a resin composition comprising 1 to 99% by weight of the polyphenylene ether resin of the present invention and 1 to 99% by weight of a polystyrene resin.

Polystyrene resins often used together with polyphenylene ether resins, which have been well-known to those skilled in the art, can be used as the polystyrene resin. For example, there can be mentioned styrene homopolymers, and copolymers of styrene with other ethylenically unsaturated monomers which are used in an amount not impairing the compatibility with the polyphenylene ether polymer. Examples of these comonomers include α-methylstyrene, acrylonitrile, methacrylonitrile, acrylic acid esters, methacrylic acid esters, maleic anhydride, N-alkylmaleimides, N-arylmaleimides and vinyloxazoline.

When a polystyrene polymer containing a rubbery elastomer is blended with the polyphenylene ether resin, a defect inherent in a polyphenylene ether resin, that is, low impact resistance, can be obviated and improved resistance can be obtained. For example, there can be used high impact resistance polystyrene, an ABS resin and an AES resin. Furthermore, styrene/butadiene block copolymers and styrene/isoprene block copolymers can also be used. Also in this case, there can be obtained a composition which is much improved in stability to thermal oxidative deterioration as compared to conventional similar compositions. When a polystyrene containing a rubber component having its unsaturated bonds entirely or partly hydrogenated is used, a more prominent effect can be attained. Products obtained by modifying these styrene/butadiene block copolymers, styrene/isoprene block copolymers and hydrogenation products thereof with maleic anhydride or the like can also be used. These rubbery block copolymers may be in the form of crosslinked particles.

The stabilized polyphenylene ether resin of the present invention can be blended with a polystyrene resin at any desired ratio. The amount of the former can be 1 to 99% by weight, preferably 50 to 99% by weight. The composition of the polyphenylene ether resin and a polystyrene resin can be formed during or after the preparation of the stabilized polyphenylene ether resin of the present invention. For example, a desired composition can be obtained by dry-blending a phenylene ether polymer having terminal groups (c), a polystyrene resin and an unsaturated compound of formula (d) and melt-kneading the resultant blend by means of a roll mill, a twin-screw extruder or the like.

The stabilized polyphenylene ether resin of the present invention or a composition comprising this resin and a polystyrene resin can advantageously be formed into a film, and the obtained film has very excellent characteristics. Various attempts have been made to form films from conventional polyphenylene ether resins, but it is very difficult to obtain uniform films because of poor stability in the processing by heat-melting, especially because of the change of the viscosity due to the change of the molecular weight with the heating. Furthermore, the obtained film is likely to undergo thermal oxidative deterioration and, therefore, cannot be put into practical use. This disadvantage is obviated by the stabilized polyphenylene ether resin of the present invention or a composition comprising this stabilized polyphenylene ether resin and a polystyrene resin, and a film can be stably prepared therefrom. The thickness of the film is not particularly critical, but the thickness is generally 5 to 1,000 μm and preferably 30 to 500 μm. This film has not only excellent heat resistance, electrically insulating properties and mechanical properties but also improved resistance to thermal oxidative deterioration, and therefore, the film can be used as an insulating film and the like. The process for the preparation of films is not particularly critical. For example, there can be adopted an ordinary melt-compression molding method and a T-die film-forming method in which the resin is heated in the extruder and is extruded from a flat die. Furthermore, a solution-casting method also can be employed in which the stabilized polyphenylene ether resin is dissolved in an appropriate solvent, such as toluene, chloroform or tetrachloroethane, and a film can also be formed from the solution by using a film-forming machine.

Inorganic fillers such as glass fibers, various stabilizers, plasticizers, flame retardants, pigments and the like can be appropriately incorporated into the polyphenylene ether resin of the present invention in accordance with conventional techniques.

Best Mode for Carrying Out the Invention

The present invention will now be described in detail with reference to the following examples that by no means limit the scope of the invention.

Measurements are carried out under the following conditions.

(1) The viscosity of the polymer is measured at 30° C. with respect to a 0.5% chloroform solution by means of a Ubbellohde viscometer and is expressed in the unit of $\eta_{sp/c}$.

(2) The $^1$H-nuclear magnetic resonance spectrum is measured by GX-270 produced by Nippon Denshi K.K., Japan, using $CDCl_3$ as the solvent, and tetramethylsilane is used as a reference.

(3) The gel permeation chromatography (hereinafter referred to as "GPC") is conducted using HL-802RTS produced by Toyo Soda Kogyo K.K., Japan. The calibration curve used in GPC is one prepared by using standard polystyrene.

(4) The free phenolic OH group in the polymer is determined by the method of Ehud Shchori et al. [Journal of Applied Polymers Science; Applied Polymer Symposium, 34, pages 103–117 (1978)].

(5) The thermogravimetric weight decrease of the polymer is measured in air under conditions of 350° C. and 60 minutes with respect to a powder obtained by a method comprising forming a 5% by weight solution of a molded article in toluene, adding an equal amount of methanol to the solution to precipitate the polymer, recovering the polymer by filtration, washing the polymer with methanol and drying the polymer, and is expressed in terms of % by weight.

(6) The resistance of the polymer to thermal oxidative deterioration is determined in the following manner. A molded article is dissolved in chloroform, and a film (having a thickness of 50 to 60 μm) formed from the solution by a casting method is allowed to stand in an air-circulating oven maintained at 180° C. for 7 hours. An increment of the absorbance at 1695 $cm^{-1}$ is measured by means of an infrared spectrophotometer and is expressed as a relative value. This absorbance is ascribed to an aldehyde group or carboxyl group formed by oxidation of the methyl groups of recurring units represented by the following formula (q):

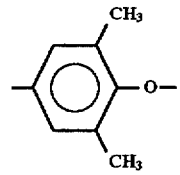

(q)

and the absorbance is an index for the degree of oxidative deterioration.

EXAMPLE 1

A starting phenylene ether polymer is prepared by oxidative coupling polymerization of 2,6-xylenol in the presence of dibutylamine according to the process disclosed in the specification of U.S. Pat. No. 4,788,277 (Japanese Patent Application No. 62-77570).

The viscosity of the obtained phenylene ether polymer is 0.545 and the glass transition temperature is about 208° C. From the results of the $^1$H-nuclear magnetic resonance spectrum analysis, it is confirmed that terminal groups represented by the following formula (r):

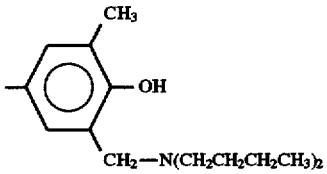

(r)

are present in an amount of 0.32 in terms of the number of the terminal groups per 100 main recurring units (q).

It also is confirmed that free phenolic hydroxyl groups are present in an amount of 0.34 in terms of the number of free phenolic hydroxyl groups per 100 main recurring units (q).

To 100 parts by weight of this phenylene ether polymer is added 10 parts by weight of styrene, and the resultant mixture is uniformly blended by means of a Henschel mixer, melt-kneaded at 300° C. in a twin-screw extruder (PCM-30 produced by Ikegai Tekko K.K., Japan) having a screw diameter of 30 mm and passed through a water tank.to obtain a pellet.

The obtained pellet is subjected to $^1$H-nuclear magnetic resonance spectrum analysis. As a result, it is confirmed from the area value of a signal of 5.02 ppm that terminal groups represented by the following formula (s):

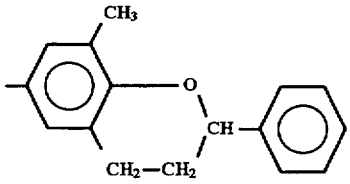

(s)

are present in an amount of 0.25 in terms of the number of the terminal groups per 100 main recurring units (q), and from the area value of a signal of 3.86 ppm, it is confirmed that rearrangement structures of formula (e) are present in an amount of 0.03 in terms of the number of the rearrangement structures per 100 main recurring units (q).

It is confirmed that free phenolic hydroxyl groups are present in an amount of 0.45 in terms of the number of free phenolic hydroxyl groups per 100 main recurring units (q). The number average molecular weight determined by GPC is 24,500, and the viscosity is 0.547.

Then, the pellet is molded at 330° C. by means of an injection molding machine (IS80EPN produced by Toshiba Kikai K.K., Japan) to form a test piece. This test piece (a strip having a width of 6.4 mm) is analyzed in the same manner as described above. It is confirmed that terminal groups of formula (s) are present in an amount of 0.23 in terms of the number of the terminal groups per 100 main recurring units (q) and rearrangement structures of formula (e) are present in an amount of 0.13 in terms or the number of the rearrangement structures per 100 main recurring units (q). It also is confirmed that free phenolic hydroxyl groups are present in an amount of 0.69 in terms of the number of free phenolic hydroxyl groups per 100 main recurring units (q).

The number average molecular weight determined by GPC is 25,000, and the viscosity is 0.552.

The notched Izod impact strength of the test piece, determined according to ASTM D-256, is 4 kg.cm/cm. The results of the measurement of heat stability in air are shown in Table 1, together with the results obtained in Comparative Example 1.

COMPARATIVE EXAMPLE 1

The same phenylene ether polymer having terminal groups (r), as used in Example 1, is extruded and pelletized under the same conditions as described in Example 1 except that styrene is not used. A test piece is prepared by subjecting this pellet to being injection-molded under the same conditions as described in Example 1. The results of the analysis of the pellet and test piece are collectively shown in Table 1.

TAB:E 1

| | Example 1 | | Comparative Example 1 | |
|---|---|---|---|---|
| | Pellet | Test Piece | Pellet | Test Piece |
| Number average molecular weight | 24,500 | 25,000 | 26,000 | 25,200 |
| Solution viscosity, $\eta_{sp/c}$ | 0.547 | 0.552 | 0.672 | 0.647 |
| Free phenolic OH groups | 0.45 | 0.69 | 0.58 | 1.25 |
| Amount of rearrangement structure of formula (e) | 0.03 | 0.13 | 0.18 | 0.58 |
| Amount of terminal groups of formula (s) | 0.25 | 0.23 | 0.00 | 0.00 |
| Thermo-gravimetric weight decrease (% by weight) | — | 5.6 | — | 15.2 |
| Increment of absorbance at 1695 $cm^{-1}$ | — | 0.23 | — | 0.43 |

Each of the amounts of the respective partial structures is expressed in terms of the number of the structures per 100 main recurring units (q), and the increment of the absorbance at 1695 $cm^{-1}$ is a relative value.

From the results shown in Table 1, it is apparent that the changes of the viscosity, molecular weight and chemical structure of the resin of Example 1 in the injection molding are much smaller than those of the comparative resin, demonstrating that the resin of Example 1 has excellent molding stability.

Furthermore, the resin of Example 1 is excellent in stability of the injection-molded piece under a high temperature oxygen atmosphere and it is seen that the resin of Example 1 is an excellent molding material having high stability when used at high temperatures.

EXAMPLE 2

A pellet is prepared in the same manner as described in Example 1 except that α-methylstyrene is used instead of the styrene used in Example 1. In the obtained pellet, terminal groups of the following formula (t):

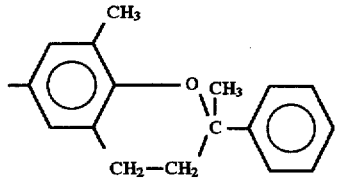

(t)

are present in an amount of 0.20 in terms of the number of the terminal groups per 100 main recurring units (q), and rearrangement structures of formula (e) are present in an amount of 0.02 in terms of the number of the rearrangement structures per 100 main recurring units (e). Furthermore, free phenolic hydroxyl groups are present in an amount of 0.48 in terms of the number of free phenolic hydroxyl groups per 100 main recurring units (q). The number average molecular weight determined by GPC is 23,600, and the viscosity is 0.531.

EXAMPLE 3

A starting phenylene ether polymer is prepared by polymerizing 90 parts by weight of 2,6-dimethylphenol and 10 parts by weight of 2,3,6-trimethylphenol in the same manner as described in Example 1.

The viscosity of the obtained phenylene ether polymer is 0.568. Terminal groups of formula (r), formula (u) and formula (v):

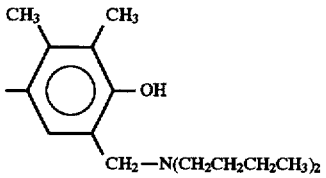

(u)

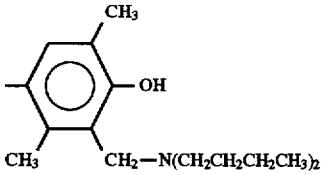

(v)

are present in a total amount of 0.36 in terms of the number of these terminal groups per 100 phenylene ether units.

Free phenolic hydroxyl groups are present in an amount of 0.26 in terms of the number of free phenolic hydroxyl groups per 100 phenylene ether units.

Pellet of the stabilized polyphenylene ether resin of the present invention is obtained in the same manner as described in Example 1, using this phenylene ether polymer.

In this pellet, terminal groups of formula (s) and terminal groups or this type which are substituted with a methyl group at the 3- or 5-position, are present in a total amount of 0.26 in terms of the number of these terminal groups per 100 phenylene ether units. Rearrangement structures or formula (e) and structures of this type in which the hydrogens on the benzene ring are partly substituted with a methyl group are present in an amount or 0.03 per 100 phenylene ether units. Free phenolic hydroxyl groups are present in an amount of 0.37 in terms of the number of free phenolic hydroxyl groups per 100 phenylene ether units. The number average molecular weight determined by GPC is 27,300.

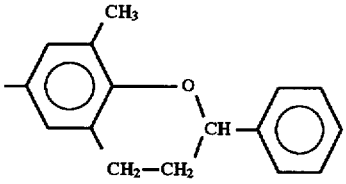

(s)

EXAMPLE 4 THROUGH 14 AND COMPARATIVE EXAMPLE 2

A starting phenylene ether polymer having a viscosity of 0.568 is prepared in the same manner as described in Example 1. In this phenylene ether polymer, terminal groups (r) are present in an amount of 0.36 in terms of the number of the terminal groups per 100 units (q), and free phenolic hydroxyl groups are present in an amount of 0.25 in terms of the number or free phenolic hydroxyl groups per 100 units (q).

A predetermined amount of a compound shown in Table 2 is added to 100 parts of this starting phenylene ether polymer, and the mixture is homogeneously blended, and melt and press-molded under conditions of 320° C. and 3 minutes. The obtained results are shown in Table 2.

COMPARATIVE EXAMPLE 3

A starting phenylene ether polymer is prepared in the same manner as described in Example 1, except that the use of dibutylamine is omitted. The viscosity of the obtained phenylene ether polymer is 0.574. Terminal groups (r) are not present at all, and the number of free phenolic OH groups is 0.71 per 100 main recurring units (q).

This starting phenylene ether polymer alone is melt and press-molded at 320° C. for 30 minutes. The obtained results are shown in Table 2.

TABLE 2

| | Compound | Parts | 6 Chroman Terminal Groups | Rearrangement structures (e) | Free Hydroxyl Groups | Viscosity |
|---|---|---|---|---|---|---|
| Example | | | | | | |
| 4 | cinnamyl alcohol | 5 | 0.18 | 0.08 | 0.48 | 0.61 |
| 5 | benzalacetone | 5 | 0.12 | 0.05 | 0.43 | 0.65 |
| 6 | cinnamoyl nitrile | 5 | 0.08 | 0.09 | 0.49 | 0.63 |
| 7 | ethyl cinnamate | 5 | 0.10 | 0.10 | 0.44 | 0.63 |
| 8 | 4-methylstyrene | 10 | 0.22 | 0.02 | 0.30 | 0.57 |
| 9 | 4-chlorostyrene | 10 | 0.19 | 0.03 | 0.36 | 0.59 |
| 10 | 4-vinylpyridine | 5 | 0.15 | 0.03 | 0.38 | 0.61 |
| 11 | stearyl acrylate | 5 | 0.05 | 0.08 | 0.50 | 0.62 |
| 12 | propyl methacrylate | 5 | 0.09 | 0.02 | 0.33 | 0.60 |
| 13 | N-vinylpyrrolidone | 5 | 0.26 | 0.01 | 0.32 | 0.61 |
| 14 | styrene | 10 | 0.24 | 0.01 | 0.34 | 0.57 |
| Comparative Example | | | | | | |
| 2 | — | 0 | 0 | 0.10 | 0.62 | 0.66 |
| 3 | — | 0 | 0 | 0.12 | 0.68 | 0.67 |

REFERENCE EXAMPLE

Test pieces obtained in Example 14 and Comparative Examples 2 and 3 are melt and press-molded at 300° C. for 2 minutes to obtain films having a thickness of 50 to 60 μm. The films are aged for 15 hours in an air-circulating oven at 180° C., and the degree of discoloration of each film is evaluated, based on the absorbance at 470 nm. The obtained results are shown in Table 3.

TABLE 3

| | Absorbance (per 100 μm) |
|---|---|
| Example 14 | 0.14 |
| Comparative Example 2 | 0.21 |
| Comparative Example 3 | 0.34 |

EXAMPLE 15

To 75 parts by weight of the stabilized polyphenylene ether resin pellet prepared in Example 1 are added to 25 parts by weight of impact resistance polystyrene (Styron 492 produced by Asahi Kasei Kogyo K.K., Japan), and they are sufficiently mixed, and melt-blended and pelletized at 300° C. by a twin-screw extruder. The obtained pellets are pressed at 300° C. for 3 minutes to obtain a film. The obtained film is exposed to heat at 150° C. for 7 hours, and the degree of advance of oxidative deterioration is evaluated, based on the absorption at 1695 $cm^{-1}$. The same pellets are injection-molded at 300° C. to form a test piece, and the test piece is exposed to heat under the same conditions as described above and the retention of Izod impact strength is measured. The results are shown in Table 4.

COMPARATIVE EXAMPLE 4

A film and a test piece are prepared in the same manner as described in Example 15 except that the polyphenylene ether resin pellet prepared in Comparative Example 1 is used. The obtained film and test piece are exposed to heat at 150° C. for 7 hours, and the oxidative deterioration and the retention of impact strength are examined. The results are shown in Table 4.

TABLE 4

| | Example 15 | Comparative Example 4 |
|---|---|---|
| Increment of absorbance at 1695 $cm^{-1}$ | 0.09 | 0.28 |
| Retention of Izod impact strength (%) | 81 | 65 |

INDUSTRIAL APPLICABILITY

The stabilized polyphenylene ether resin of the present invention has excellent thermal stability, differing from conventional polyphenylene ether resins which are likely to undergo thermal oxidative deterioration. Furthermore, a composition comprising this stabilized polyphenylene ether resin and a polystyrene resin has excellent thermal stability and moldability, and especially, a composition comprising the stabilized polyphenylene ether resin and a polystyrene resin containing a rubbery elastomer has not only excellent thermal stability but also improved impact resistance, overcoming another problem of the conventional polyphenylene ethers, i.e., poor impact resistance.

We claim:

1. A polyphenylene ether resin comprising a plurality of polyphenylene ether chains, each comprising recurring polyphenylene ether units, said plurality of polyphenylene ether chains collectively containing terminal 6-chroman groups represented by the following formula (a):

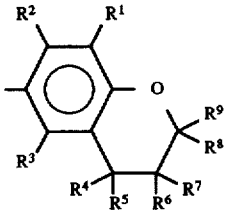

(a)

wherein $R^1$ through $R^5$ each independently represent a hydrogen atom, [an] *a* $C_1$–$C_{20}$ alkyl group[, a substituted alkyl group] *which is unsubstituted or substituted with a halogen atom, a hydroxyl group, an amino group or a lower alkoxyl group*, a halogen atom, [an] *a* $C_6$–$C_{20}$ aryl group [or a substituted aryl group,] *which is unsubstituted or substituted with a lower alkyl group, a halogen atom, a hydroxyl group, an amino group or a lower alkoxyl group;* and $R^6$ [and] *through* $R^9$ each independently represent a hydrogen atom, [an] *a* $C_1$–$C_{20}$ alkyl group[, a substituted alkyl group] *which is unsubstituted or substituted with a halogen atom, a hydroxyl group, an amino group or a lower alkoxyl group*, [and] *a lower* alkenyl group, a [substituted alkenyl groups] *1-hydroxyl-3-propenyl group*, [an] *a* $C_6$–$C_{20}$ aryl group [or, a substituted aryl group] *which is unsubstituted or substituted with a lower alkyl group, a lower alkoxyl group, a halogen atom, a hydroxyl group, an amino group or an aminoalkyl group or a carboxylic acid ester group,* with the proviso that $R^6$[,] *and* $R^7$, *and* $R^8$ and $R^9$ are independently bonded to form a ring or not bonded to each other, wherein the amount of [the] said terminal 6-chroman groups is at least 0.01 in terms of the number of said terminal 6-chroman groups per 100 phenylene ether units in the resin, and the number average molecular weight of the resin is in the range of from 1,000 to 100,000.

2. The polyphenylene ether resin according to claim 1, wherein the number of said terminal 6-chroman groups (a) is at least 0.15 on the average per 100 phenylene ether units.

3. The polyphenylene ether resin according to claim 2, wherein the number of said terminal 6-chroman groups is at least 0.2 on the average per 100 phenylene ether units.

4. The polyphenylene ether resin according to claim 1, wherein each of two or three substitutents of substituents $R^6$ through $R^9$ is a hydrogen atom.

5. The polyphenylene ether resin according to claim 1, wherein each of two or three substituents of substituents $R^6$ through $R^9$ is a hydrogen atom and each remaining substituent is independently selected from [an] *a* $C_6$–$C_{20}$ aryl group [and, a substituted aryl group] *which is unsubstituted or substituted with a lower alkyl group, a lower alkoxyl group, a halogen atom, a hydroxyl group, an amino group or an aminoalkyl group; and a carboxylic acid ester group.*

6. The polyphenylene ether resin according to claim 5, wherein each of three substituents of substituents $R^6$ through $R^9$ is a hydrogen atom and the remaining substituent is a phenyl group, an alkyl-substituted phenyl group [or], a halogenphenyl group *or a carboxylic acid ester group.*

7. The polyphenylene ether resin according to claim 1, wherein 90 to 100% of the phenylene ether units are phenylene ether units represented by the following formula:

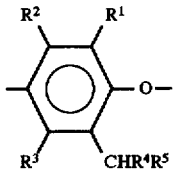

wherein $R^1$ represents a methyl group and $R^2$ through $R^5$ each represent a hydrogen atom.

8. A process for the preparation of a polyphenylene ether resin of claim 1, which comprises heating a phenylene ether polymer having terminal groups represented by the following formula (c):

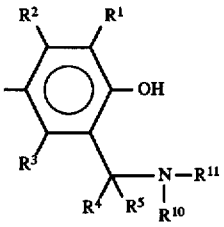

(c)

wherein $R^1$ through $R^5$ each independently represent a hydrogen atom, [an] *a* $C_1$–$C_{20}$ alkyl group[, a substituted alkyl group] *which is unsubstituted or substituted with a halogen atom, a hydroxyl group, an amino group or a lower alkoxyl group*, a halogen atom, [an] *a* $C_6$–$C_{20}$ aryl group [or a substituted aryl group,] *which is unsubstituted or substituted with a lower alkyl group, a halogen atom, a hydroxyl group, an amino group or a lower alkoxyl group;* and $R^{10}$ and $R^{11}$ each independently represent a hydrogen atom, [an] *a* $C_1$–$C_{20}$ alkyl group [or a substituted alkyl group], *a* $C_1$–$C_{20}$ *hydroxyalkyl group, a* $C_2$–$C_{22}$ *alkoxyalkyl group, a* $C_3$–$C_{22}$ *acyloxyalkyl group, or a* $C_4$–$C_{20}$ *polyalkylene ether group,* with the proviso that $R^{10}$ and $R^{11}$ do not simultaneously represent a hydrogen atom, and a [command] *compound* having a carbon-to-carbon double bond, which is represented by the following formula (d):

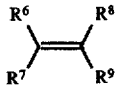

(d)

wherein $R^6$ through $R^9$ each independently represent a hydrogen atom, [an] *a* $C_1$–$C_{20}$ alkyl group[, a substituted alkyl group] *which is unsubstituted or substituted with a halogen atom, a hydroxyl group, an amino group or a lower alkoxyl group*, [an] *a lower* alkenyl group, a [substituted alkenyl groups] *1-hydroxyl-3-propenyl group*, [an] *a* $C_6$–$C_{20}$ aryl group [or, a substituted aryl group] *which is unsubstituted or substituted with a lower alkyl group, a lower alkoxyl group, a halogen atom, a hydroxyl group, an amino group or an aminoalkyl group or a carboxylic acid ester group*, at a temperature of not lower than the glass transition temperature of the phenylene ether polymer in the absence of a radical polymerization initiator.

9. A resin composition comprising 1 to 99% by weight of a polyphenylene ether resin of claim 1 and 1 to 99% by weight of a polystyrene resin.

10. A polyphenylene ether resin according to claim 1, which is a film.

11. A resin composition according to claim 9, which is a film.

*12. The polyphenylene ether resin according to claim 1, 5 or 6, wherein said carboxylic acid ester group defined for* $R^6$ *through* $R^9$ *is selected from the group consisting of methyl carboxylate, ethyl carboxylate, propyl carboxylate, n-butyl carboxylate, isobutyl carboxylate, tert-butyl carboxylate, 2-ethylhexyl carboxylate, octyl carboxylate, isodecyl carboxylate, lauryl carboxylate, lauryltridecyl carboxylate, tridecyl carboxylate, cetylstearyl carboxylate, stearyl carboxylate, cyclohexyl carboxylate and benzyl carboxylate groups.*

*13. The polyphenylene ether resin according to claim 1, 5 or 6, wherein said carboxylic acid ester group defined for* $R^6$ *through* $R^9$ *is a stearyl carboxylate group.*

*14. The process according to claim 8, wherein said carboxylic acid ester group defined for* $R^6$ *through* $R^9$ *is selected from the group consisting of methyl carboxylate, ethyl carboxylate, propyl carboxylate, n-butyl carboxylate, isobutyl carboxylate, tert-butyl carboxylate, 2-ethylhexyl carboxylate, octyl carboxylate, isodecyl carboxylate, lauryl carboxylate, lauryltridecyl carboxylate, tridecyl carboxylate, cetylstearyl carboxylate, stearyl carboxylate, cyclohexyl carboxylate and benzyl carboxylate groups.*

*15. The process according to claim 8, wherein said carboxylic acid ester group defined for* $R^6$ *through* $R^9$ *is a stearyl carboxylate group.*

* * * * *